United States Patent
Byxbe et al.

(10) Patent No.: US 11,004,347 B1
(45) Date of Patent: May 11, 2021

(54) LOOMING BALL PILOT GUIDANCE AND CUING SYMBOLOGY

(71) Applicant: Rockwell Collins, Inc., Cedar Rapids, IA (US)

(72) Inventors: Valerie R. Byxbe, Cedar Rapids, IA (US); Michael P. Matessa, Ben Lomond, CA (US); Matthew J. Cunnien, Lino Lakes, MN (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/743,932

(22) Filed: Jan. 15, 2020

(51) Int. Cl.
*G01C 23/00* (2006.01)
*G08G 5/00* (2006.01)
*B64D 43/00* (2006.01)

(52) U.S. Cl.
CPC ........... *G08G 5/0047* (2013.01); *B64D 43/00* (2013.01); *G01C 23/00* (2013.01)

(58) Field of Classification Search
CPC ....... G08G 5/0047; B64D 43/00; G01C 23/00
USPC .......................................................... 340/971
See application file for complete search history.

(56) References Cited

U.S. PATENT DOCUMENTS

| | | | | |
|---|---|---|---|---|
| 3,574,283 A | * | 4/1971 | Albers | G02B 27/0149 73/178 R |
| 4,554,545 A | * | 11/1985 | Lowe | G01C 23/00 340/951 |
| 5,745,863 A | * | 4/1998 | Uhlenhop | G01C 23/005 701/1 |
| 7,463,954 B1 | * | 12/2008 | He | G01C 23/00 340/979 |
| 7,907,132 B1 | * | 3/2011 | Hintz | G06F 3/147 345/204 |
| 8,576,094 B2 | * | 11/2013 | Suddreth | G08G 5/0021 340/972 |
| 8,615,337 B1 | * | 12/2013 | McCusker | G01C 21/20 701/14 |
| 9,086,280 B2 | | 7/2015 | Gurusamy et al. | |
| 9,423,271 B1 | * | 8/2016 | Bell | G01C 23/00 |
| 9,530,323 B1 | * | 12/2016 | Maji | G01S 13/06 |
| 10,378,920 B2 | | 8/2019 | Hodge | |
| 2002/0011950 A1 | * | 1/2002 | Frazier | G01C 23/00 342/357.32 |
| 2002/0089432 A1 | * | 7/2002 | Staggs | G01S 13/933 340/945 |

(Continued)

FOREIGN PATENT DOCUMENTS

| EP | 2116811 B1 | 7/2015 |
|---|---|---|
| EP | 1835260 B1 | 2/2017 |

*Primary Examiner* — Kerri L McNally
*Assistant Examiner* — Thang D Tran
(74) *Attorney, Agent, or Firm* — Suiter Swantz pc llo

(57) ABSTRACT

A system and method for generation and display of a dynamic looming ball deviation symbology (DLBDS) to a pilot receives inputs from a plurality of sources and displays a single source 3D deviation indicator to limit a scan requirement of a pilot. The system generates and displays the DLBDS relative to an ownship flight path marker intuitively useful to indicate each of a lateral deviation, a vertical deviation, and a longitudinal deviation relative to a desired object or position relative to the desired object. The DLBDS is displayed relative to the ownship aircraft and indicates deviation to be corrected to position the aircraft at the desired position relative to the object.

15 Claims, 13 Drawing Sheets

(56) References Cited

U.S. PATENT DOCUMENTS

| | | | | |
|---|---|---|---|---|
| 2003/0132860 A1* | 7/2003 | Feyereisen | ............ | G01C 23/00 340/973 |
| 2003/0222795 A1* | 12/2003 | Holforty | ................ | B64D 43/00 340/968 |
| 2007/0002078 A1* | 1/2007 | He | ........................ | G01C 23/00 345/633 |
| 2007/0188350 A1* | 8/2007 | He | ...................... | G01C 23/005 340/979 |
| 2008/0262664 A1* | 10/2008 | Schnell | .................. | G01C 23/00 701/4 |
| 2009/0109065 A1* | 4/2009 | Pinheiro | .............. | G08G 5/0078 340/971 |
| 2010/0097241 A1* | 4/2010 | Suddreth | ................ | G08G 5/04 340/972 |
| 2010/0207845 A1* | 8/2010 | Pal | ........................... | G01S 1/68 345/7 |
| 2010/0250030 A1* | 9/2010 | Nichols | ............... | G01C 23/005 701/7 |
| 2010/0283782 A1* | 11/2010 | He | ........................ | G06T 17/05 345/420 |
| 2011/0313597 A1* | 12/2011 | Wilson | .................. | G01C 23/00 701/3 |
| 2013/0060466 A1* | 3/2013 | Gurusamy | ........... | G01C 23/005 701/465 |
| 2016/0103579 A1* | 4/2016 | Coulmeau | ............ | G08G 5/0047 701/533 |
| 2017/0243497 A1* | 8/2017 | Kuttappan | ........... | G08G 5/0078 |
| 2017/0276508 A1* | 9/2017 | Hodge | ................ | G05D 1/0684 |
| 2019/0019419 A1* | 1/2019 | Gannon | .................. | G09B 5/02 |

\* cited by examiner

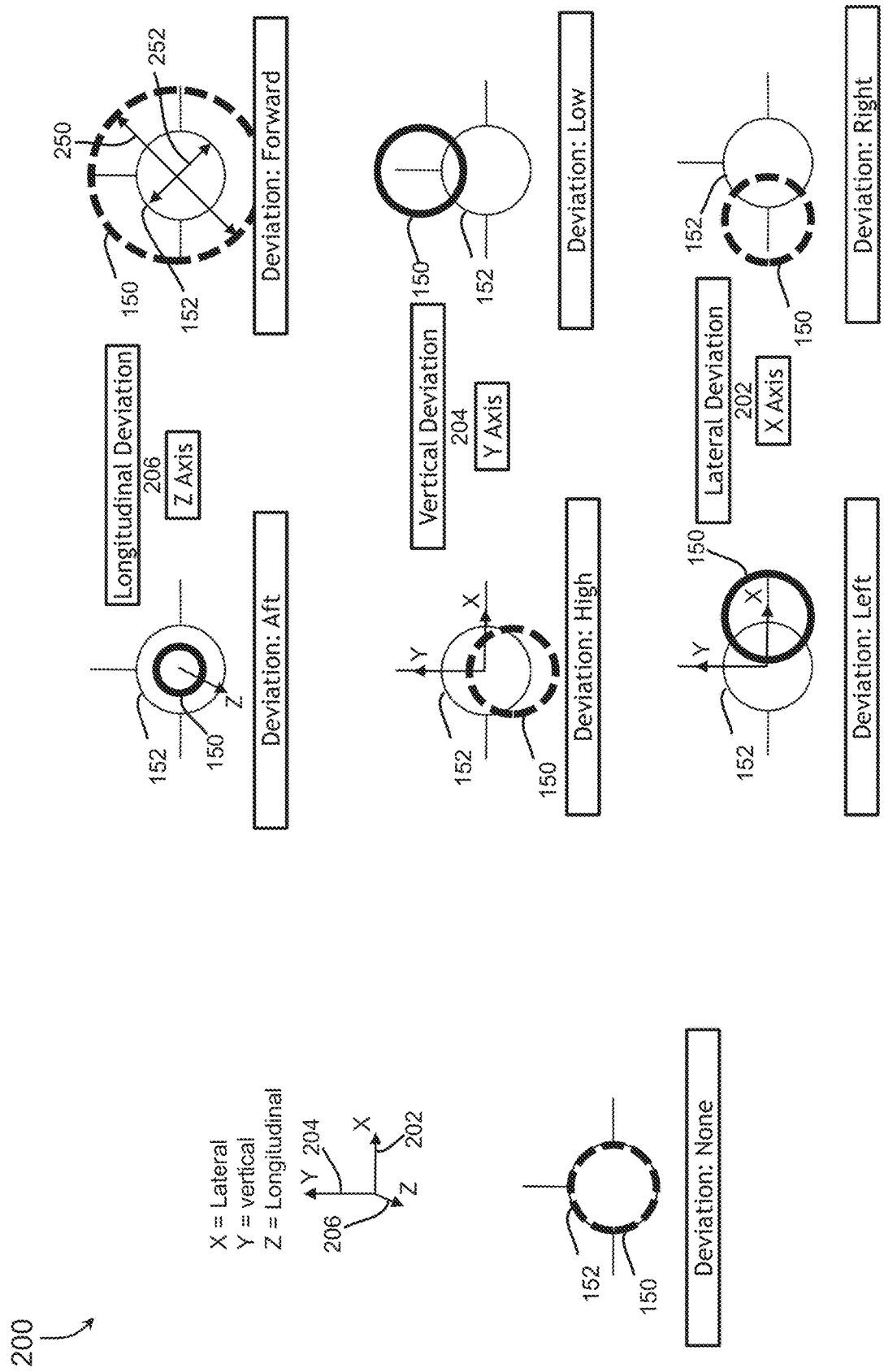

LOOMING BALL PILOT GUIDANCE AND CUING SYMBOLOGY

BACKGROUND

Increasing situational awareness may be a continuous goal of aviation professionals. A lack of situational awareness may be a causal factor in many aircraft accidents.

One limitation in pilot situational awareness may include an overload of displayed information available to the pilot. Too much information may be as hazardous as not enough information. With multiple sources of guidance information, a pilot may become overloaded and a pilot scan may break down leading to deviation in one or more axes of desired trajectory.

Traditional flight directors may display deviation in only two axes: vertical and lateral. This limitation requires a pilot to continuously take eyes away from a primary flight display to reference longitudinal deviation. Whether the longitudinal deviation is range, time, or speed, the pilot must look elsewhere to reference the longitudinal deviation and increase possible deviations in vertical and lateral trajectories while looking elsewhere.

Therefore, a need remains for a system and related method which may overcome these limitations and provide a novel solution to pilot guidance offering an intuitive single source of pilot guidance displayed on a pilot display.

SUMMARY

In one aspect, embodiments of the inventive concepts disclosed herein are directed to a system for display of looming ball aircraft guidance. The system may comprise a pilot display available to a pilot of an aircraft, the pilot display including a flight path marker (FPM) and a data link configured for a data communication external to the aircraft. The system may further include an aircraft system bus configured for a communication of an aircraft state and a flight controller operatively coupled with each of the pilot display, the data link, and the aircraft system bus, the flight controller configured for determining a position and a trajectory of the aircraft.

For drive of the flight controller, the system may include a tangible, non-transitory memory configured to communicate with the flight controller, the tangible, non-transitory memory having instructions stored therein that, in response to execution by the flight controller, cause the flight controller to carry out each function of the system herein.

The flight controller may receive, from the data link, an object data representative of an object, the object data including a position and a trajectory of the object and receive from the aircraft system bus, a position and trajectory of the aircraft. The flight controller may receive a command from the pilot to maintain a desired position relative to the object and generate a three-dimensional deviation between the position of the aircraft and the desired position relative to the object based on the object data and the position of the aircraft, the three-dimensional deviation relative to the aircraft, the three-dimensional deviation including a lateral deviation, a vertical deviation, and a longitudinal deviation.

The flight controller may also generate a dynamic looming ball deviation symbology (DLBDS), the DLBDS having a diameter based on the longitudinal deviation, the diameter relative to a diameter of the FPM and display, on the pilot display, the DLBDS relative to the FPM, the DLBDS displayed in a Y position relative to the FPM based on the vertical deviation and an X position relative to the FPM based on the lateral deviation.

A further embodiment of the inventive concepts disclosed herein may include a method for display of looming ball aircraft guidance. The method may comprise receiving a continuously updated object data representative of an object, the object data including a position and a trajectory of the object and receiving a continuously updated position and trajectory of an aircraft. The method may include receiving a pilot command to maintain a desired position relative to the object generating a three-dimensional deviation between the position of the aircraft and the desired position, the three-dimensional deviation relative to the aircraft, the three-dimensional deviation including a lateral deviation, a vertical deviation, and a longitudinal deviation.

The method may further include generating a dynamic looming ball deviation symbology (DLBDS), the DLBDS having a diameter based on the longitudinal deviation, the diameter relative to a diameter of a flight path marker (FPM) and displaying, on a pilot display, the DLBDS relative to the FPM, the DLBDS displayed in a Y position relative to the FPM based on the vertical deviation and an X position relative to the FPM based on the lateral deviation.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which:

FIG. 2 is a diagram of exemplary single axis deviations indicated by the dynamic looming ball deviation symbology in accordance with an embodiment of the inventive concepts disclosed herein;

DETAILED DESCRIPTION OF EXEMPLARY EMBODIMENTS

Figure 1:
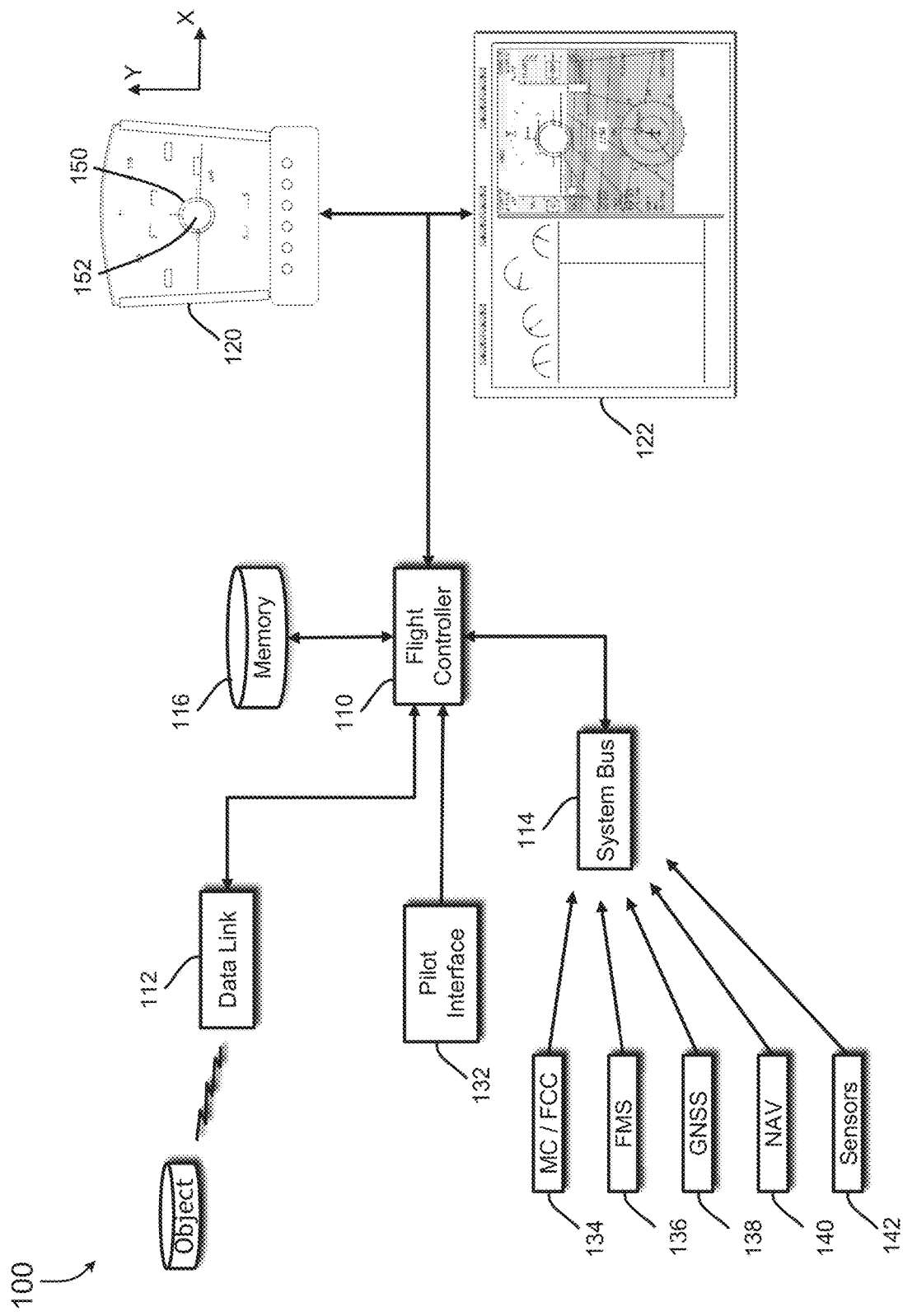
FIG. 1 is a diagram of a system for display of looming ball aircraft guidance in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a system and method for generation and display of a dynamic looming ball deviation symbology (DLBDS) to a pilot receives inputs from a plurality of sources and displays a single source 3D deviation indicator to limit a scan requirement of a pilot. The system generates and displays the DLBDS relative to an ownship flight path marker intuitively useful to indicate each of a lateral deviation, a vertical deviation, and a longitudinal deviation relative to a desired object or position relative to the desired object. The DLBDS is displayed relative to the ownship aircraft and indicates deviation to be corrected to position the aircraft at the desired position relative to the object

REFERENCE CHART

| | |
|---|---|
| 100 | System for Looming Ball Display |
| 110 | Controller |
| 112 | Data Link |
| 114 | System Bus |
| 116 | Memory |
| 120 | Heads Up Display (HUD) |
| 122 | Multi-Function Display (MFD) |
| 132 | Pilot Interface |
| 134 | Mission Computer |
| 136 | Flight Management System |
| 138 | GNSS |
| 140 | Navigation Suite |
| 142 | Sensors |
| 150 | Dynamic Looming Ball Deviation Symbology (DLBDS) |
| 152 | Flight Path Marker (FPM) |
| 200 | Deviation Display |
| 202 | X Axis (Lateral) |
| 204 | Y Axis (Vertical) |
| 206 | Z Axis (Longitudinal) |
| 230 | Flight Lead |
| 232 | Desired Position |
| 234 | Timeline Position |
| 240 | Wingman |
| 242 | Position Boundary |
| 244 | Aerial Refueling Probe |
| 260 | Strike Aircraft |
| 300 | Deviation Examples |
| 302 | Lateral Deviation |
| 304 | Vertical Deviation |
| 306 | Longitudinal Deviation |
| 308 | 3D Deviation |
| 320 | Surface Target |
| 322 | Relative Orbit |
| 330 | Landing Surface |
| 332 | Glide Slope |
| 400 | Method Flow |
| 402 | Receive Object Data |
| 404 | Receive Aircraft Position Trajectory |
| 406 | Receiving a Pilot Command |
| 408 | Generating a 3D Deviation |
| 410 | Generating a DLBDS |
| 412 | Displaying the DLBDS Relative to the FPM |

FIG. 1 System

Referring now to FIG. 1, a diagram of a system for display of looming ball aircraft guidance in accordance with an embodiment of the inventive concepts disclosed herein is shown. Generally, a system for display of looming ball aircraft guidance 100 may function to display to a pilot, a Dynamic Looming Ball Deviation Symbology 150 (DLBDS) indicating to the pilot a three-dimensional deviation from a desired object.

The system for display of looming ball aircraft guidance 100 may present the DLBDS 150 within a pilot display including a heads-up display (HUD) 120 and a multi-function display 122 available to a pilot of an aircraft. As used herein, a reference to the HUD 120 may be considered a reference to each type of display available to the pilot which may include a head worn display as well.

The pilot display HUD 120 may include a flight path marker (FPM) 152 indicating a flight path of the aircraft. The FPM 152 may be a representation of traditional markers available to the pilot of various types of aircraft including a velocity vector, a flight director, and a plurality of symbology types available to the pilot. Among these, most FPM variants may maintain one circular portion with a constant diameter.

In one embodiment of the inventive concepts disclosed herein, the system for display of looming ball aircraft guidance 100 may function to display the DLBDS 150 via an onboard display available to an onboard human pilot, an offboard display available to an offboard human pilot, and present the DLBDS 150 to an onboard autopilot configured to interpret the information related to the display and make corrections to a flight path of the aircraft based on those interpretations.

The system for display of looming ball aircraft guidance 100 may include a data link 112 configured for a data communication external to the aircraft. The data link 112 may be specifically configured to send and receive data specific to a position and trajectory of a plurality of objects of interest to the pilot. Specifically, the data link 112 may be configured with a data transfer rate of sufficient speed to enable the system for display of looming ball aircraft guidance 100 to receive and respond to rapidly changing positions and trajectories of the object.

Alternatively, the data link 112 may also function within a traditional data link 112 useable for additional services associated with data transfer between platforms. For example, a traditional tactical data link 112 such as a Link-16 or Situational Awareness Data Link (SADL) may provide the system for display of looming ball aircraft guidance 100 with sufficient bandwidth to transfer usable object data related to the object.

To enable the system for display of looming ball aircraft guidance 100 to receive data pertinent to the ownship aircraft, the system for display of looming ball aircraft guidance 100 may include an aircraft system bus 114 configured for a communication of an aircraft state. Exemplary aircraft state variables may include an input from a mission computer and/or a flight control computer 134, an input from a flight management system 136, a global navigation satellite system (GNSS) input 138, and a navigation system input 140.

Also, the system bus 114 may receive an input from one or more onboard sensors 142 including, for example, a barometric sensor, a radar sensor, a visual sensor, an infrared sensor, and radio altitude sensor. In addition, a radio frequency receiver may function as a sensor 142 receiving RF signals from a plurality of sources including an RF VHF omnidirectional range (VOR), an RF Instrument Landing System (ILS), an automated carrier landing system (ACLS), and additional types of RF guidance systems.

For control, the system for display of looming ball aircraft guidance 100 may include a flight controller 110 operatively coupled with each of the pilot display 120, the data link 112, and the aircraft system bus 114. The flight controller 110 may be specifically configured for determining and receiving a position and a trajectory of the aircraft based on one or more of the inputs from the system bus 114. In embodiments, the flight controller 110 may include a mission computer, a flight control computer, and a flight management system.

The system for display of looming ball aircraft guidance 100 may also include a tangible, non-transitory memory 116 configured to communicate with the flight controller 110, the tangible, non-transitory memory 116 may have instructions stored therein that, in response to execution by the flight controller 110, cause the flight controller 110 to perform each task enabling a function of the system for display of looming ball aircraft guidance 100.

System Function

In one embodiment of the inventive concepts disclosed herein, to accurately display the DLBDS 150, the flight controller 110 may receive, from the data link 112, an object data representative of an object, the object data including at least a position and a trajectory of the object. Here, the object may include a position in space or location to which the pilot may desire accurate directive display symbology. Exemplary objects contemplated herein may include an aircraft, an aerial refueling boom, an aerial refueling basket, a landing surface, a surface target, a ship, a time-based position, a speed-based position, and a three-dimensional path.

In one embodiment of the inventive concepts disclosed herein, the object data may include additional details about the object of interest to the aircraft. Some object data may include an object type (e.g., aircraft, ship, runway, tanker), an object size, an object mission, and a plurality of desired positions relative to the object. For example, if the object is a tanker aircraft, each position around the tanker aircraft may be received via the data link 112. A precontact position, a contact position, a left and right observation position, etc. Should the object be a surface target, exemplary object data may include a time on target, a run-in heading, collateral damage estimates, threat levels, etc.

In one embodiment of the inventive concepts disclosed herein, the flight controller 110 may further receive a command from the pilot to maintain a desired position relative to the object. Here, the pilot may include an onboard human pilot, an offboard human pilot, and an autopilot. The pilot command may include a bearing and range from the object, a position relative to the object, and commanded guidance to the object via a 3D path relative to the object.

For example, one pilot command may include direction to and maintenance of a formation position laterally and longitudinally offset from an object aircraft. Another pilot command may include a bearing, range, and altitude (BRA) relative to an object surface target. Should the the object be a point in space, the pilot command may include commanded direction to fly directly to the point in space object.

The flight controller 110 may receive from the aircraft system bus 114, a continuously updated position and trajectory of the aircraft and generate a desired position relative to the object. In one embodiment of the inventive concepts disclosed herein, the position and trajectory of the aircraft may be received from an onboard positioning system such as a GNSS and Inertial Navigation System (INS) or determined by the flight controller 110 based on data received from a plurality of sources and sensors. For example, the aircraft system bus 114 may be operatively coupled with the onboard GNSS and barometric altimeter. In this manner, the onboard systems and sensors may input the position (e.g., latitude, longitude) and trajectory (e.g., vector and speed) to the aircraft system bus 114 for flight controller 110 use.

For accuracy, the position of the aircraft may include a center of mass of the aircraft, a specific position of a refueling probe employed by the aircraft, and a specific position of an aerial refueling receiver receptacle sited near an upper surface of the aircraft. In one embodiment of the inventive concepts disclosed herein, the desired position relative to the object may be based on the pilot command and may include a wingman formation position, a contact position prior to aerial refueling, and a deployed formation position.

The flight controller 110 may generate a three-dimensional (3D) deviation between the position of the aircraft and the desired position relative to the object based on the object data and the position of the aircraft, the three-dimensional deviation relative to the aircraft, the 3D deviation including a lateral deviation, a vertical deviation, and a longitudinal deviation. Here, the 3D deviation may include a vector in space from one position (aircraft) to another (desired position 232). In some situations, the desired position 232 may be anywhere from an exemplary 30 miles in trail to zero.

FIG. 2 DLBDS Basics

Referring now to FIG. 2, a diagram of exemplary single axis deviations indicated by the dynamic looming ball deviation symbology in accordance with an embodiment of the inventive concepts disclosed herein is shown. Single axis deviations 200 may indicate exemplary display positions of the DLBDS 150 to indicate to the pilot a "fly to" direction to correct the deviation. Each deviation indicated by the DLBDS 150 may be relative to the ownship aircraft.

In one embodiment of the inventive concepts disclosed herein, the DLBDS 150 may comprise a segmented or solid circle displayed relative to the FPM 152 where a zero deviation in each of the lateral deviation, the vertical deviation, and the longitudinal deviation may be represented by a DLBDS 150 concentrically displayed with the FPM 152.

DLBDS Diameter

A purely longitudinal deviation along a Z axis 206 may be indicated by a DLBDS diameter 250 smaller or larger than the FPM diameter 252 where a zero longitudinal deviation may be displayed via the DLBDS diameter 250 equal to the FPM diameter 252.

The flight controller 110 may generate the DLBDS 150, the DLBDS 150 having a DLBDS diameter 250 representative of the longitudinal deviation, the diameter relative to a diameter of the FPM 252. Here, the flight controller 110 may generate the DLBDS diameter 250 increasing or decreasing based on the longitudinal deviation. In one embodiment of the inventive concepts disclosed herein, a longitudinal deviation aft of the desired position may result in the DLBDS diameter 250 smaller than the FPM diameter 252, and a longitudinal deviation forward of the desired position may result in the DLBDS diameter 250 larger than the FPM diameter 252.

For example, one aircraft may employ an FPM diameter 252 of an exemplary five mils. Should the flight controller 110 determine the aircraft is longitudinally distant from the desired position 232, the flight controller 110 may generate the DLBDS diameter 250 at an exemplary three mils to indicate to the pilot a too distant position from the desired position offset indicating a possible correction of adding power and flying forward.

Y and X Positions

The flight controller 110 may display, on the pilot display 120, the DLBDS 150 relative to the FPM 152, the DLBDS 150 displayed in a Y position relative to the FPM 152 based on the vertical deviation and an X position relative to the FPM 152 based on the lateral deviation.

Similarly, a purely vertical deviation in a Y axis 204 may be indicated by the DLBDS 150 either high or low relative to the FPM 152. As viewed by the pilot, the Y position relative to the FPM 152 may include a position above the FMP 152 corresponding a low vertical deviation and a position below the FMP 152 corresponding a high vertical deviation.

A purely lateral deviation within an X axis 202 may indicate the DLBDS 150 left or right of the FPM 152. In the lateral, the X position relative to the FPM 152 may enable a position right of the FPM 152 corresponding to a left deviation, and a position left of the FPM 152 corresponding to a right deviation.

In one embodiment of the inventive concepts disclosed herein, the non-transitory memory 116 may be further configured to cause the flight controller 110 to continuously update each of the position of the object and the position and trajectory of the aircraft, continuously update the three-dimensional deviation, continuously update the DLBDS diameter 250, the Y position, and the X position based on an updated three-dimensional deviation, and display the DLBDS 150 at the continuously updated Y position, X position, and DLBDS diameter 250.

FIG. 3 a-J DLBDS Examples

Referring now to FIGS. 3A-3J, diagrams of exemplary multi axis deviations displayable by an embodiment of the inventive concepts disclosed herein are shown. A plurality of multi axis deviation examples 300 may indicate a variety of situations where the system for display of looming ball aircraft guidance 100 may function to generate and display the DLBDS 150 to the pilot.

Figure 3A:
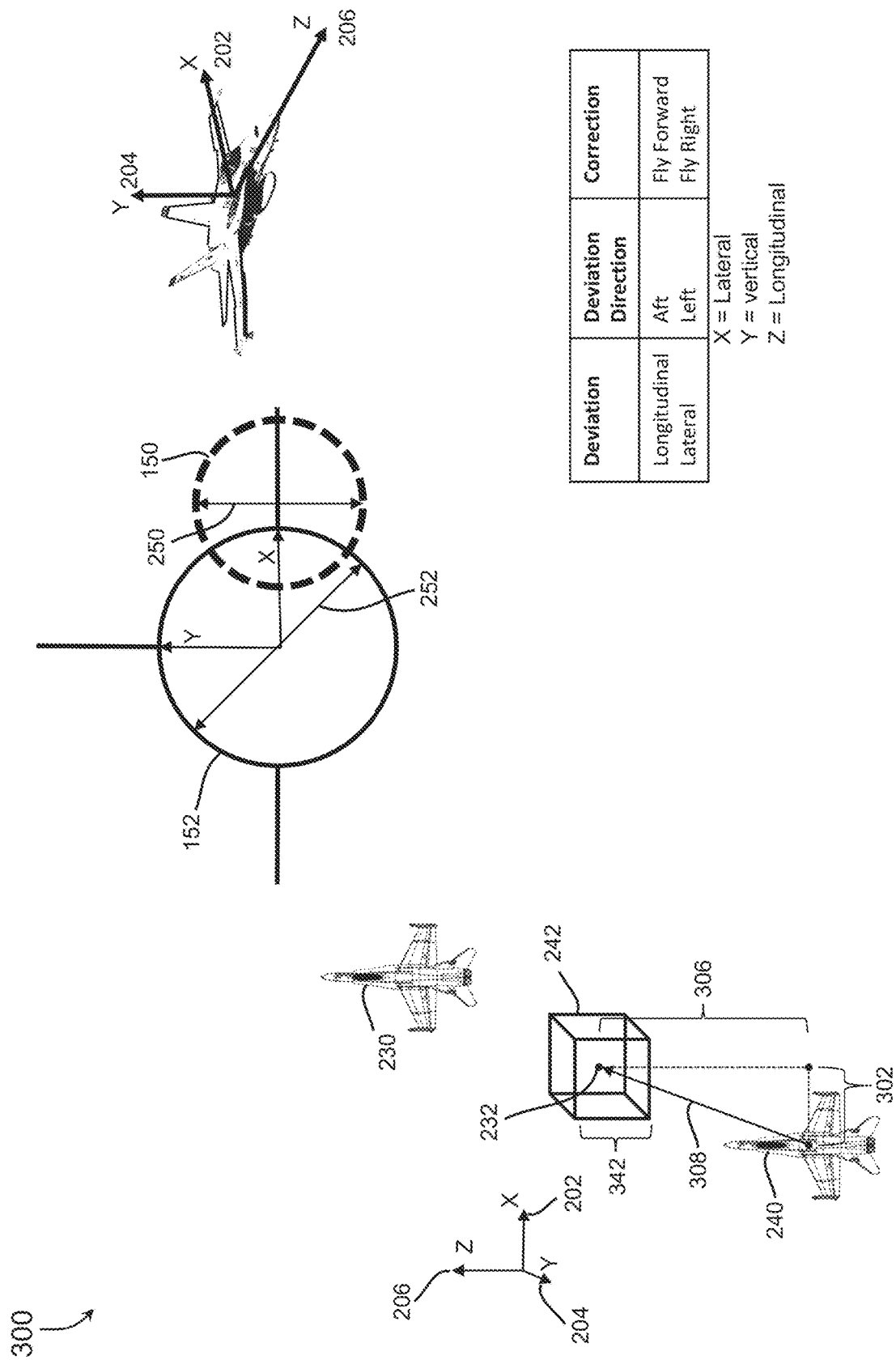
FIGS. 3A-J are diagrams of exemplary multi axis deviations displayable by an embodiment of the inventive concepts disclosed herein.

Referring to FIG. 3A, a two-dimensional deviation may be indicated with a lead aircraft 230 and a wingman aircraft 240 in an echelon formation. Here, the wingman aircraft 240 is aft and left of the desired position 232 relative to the object (a lead aircraft 230) as indicated by a longitudinal deviation 306 in the Z axis 206 and a lateral deviation 302 in the X axis 202 resulting in the 3D deviation 308 calculated by the flight controller 110. The flight controller 110 may then determine the DLBDS diameter 250 based on the longitudinal deviation 306 and the X axis 202 position of the DLBDS 150 based on the lateral deviation 302. To correct the 3D deviation 308, the wingman aircraft 240 must fly forward and right to reach the desired position 232. As there is no vertical deviation here, no vertical input may be required by the pilot of the wingman aircraft 240 to return to the desired position 232.

In one embodiment of the inventive concepts disclosed herein, the non-transitory memory 116 may be further configured to cause the flight controller 110 to generate a desired position boundary 242 around the desired position 232 relative to the object (here, the lead aircraft 230). Depending on a plurality of factors, the desired position boundary 242 may have a boundary size 342 based on the plurality of factors. The flight controller 110 may display the DLBDS 150 based on the three-dimensional deviation 308 between the position of the aircraft 240 and the desired position boundary 242.

In one embodiment of the inventive concepts disclosed herein, the boundary size 342 may be based on a 1) range between the desired relative position 232 and the lead aircraft object 230, 2) a size of each of the lead aircraft object 230 and the wingman aircraft 240, and 3) a mission of the wingman aircraft 240.

For example, the wingman aircraft 240 in a distant formation of an exemplary 10 miles in trail of the lead aircraft 230 may have a position boundary 242 of greater size 342 than a wingman aircraft 240 positioning in a contact position behind a tanker aircraft object for aerial refueling.

In one embodiment of the inventive concepts disclosed herein, the desired position 232 relative to the object may be based on a mission of the aircraft, the aircraft state, an object type, an object position, and an object trajectory. For example, on an air drop mission, one desired position 232 may be aft and above the lead aircraft 230 to ensure collision avoidance with dropped items. Where the object type may be a tanker aircraft, once desired position may be am echelon position to wait for a turn receiving fuel. Where the object position may be at low altitude, a more distant desired position may be prudent. The object trajectory pointed at a mountain prior to a turn may lead to a more distant desired position 232.

In one embodiment of the inventive concepts disclosed herein, the display of the DLBDS 150 relative to the FPM 152 may further include a dynamic motion of the DLBDS 150 based on a change in the three-dimensional deviation and a rate of change in the three-dimensional deviation. For example, as the aircraft may get closer to the desired position 232, the flight controller 110 may alter the display of the DLBDS 150 to slow a rate of correction to the pilot. In this manner, the flight controller 110 may command a slower correction to the desired position as the 3D deviation reduces in magnitude.

Similarly, once a correction has been made by the pilot, the flight controller 110 may alter the display of the DLBDS 150 to maintain the correction. For example, as a correction may include flying right to fly to the desired position 232, the flight controller 110 may zero the lateral correction required once the pilot is correcting for the deviation.

Also, once the aircraft 240 approaches the desired position 232, the flight controller 110 may anticipate the zero deviation (arrival at the desired position 232) and indicate a left turn here to discontinue the correction and settle in to the desired position 232.

Figure 3B:
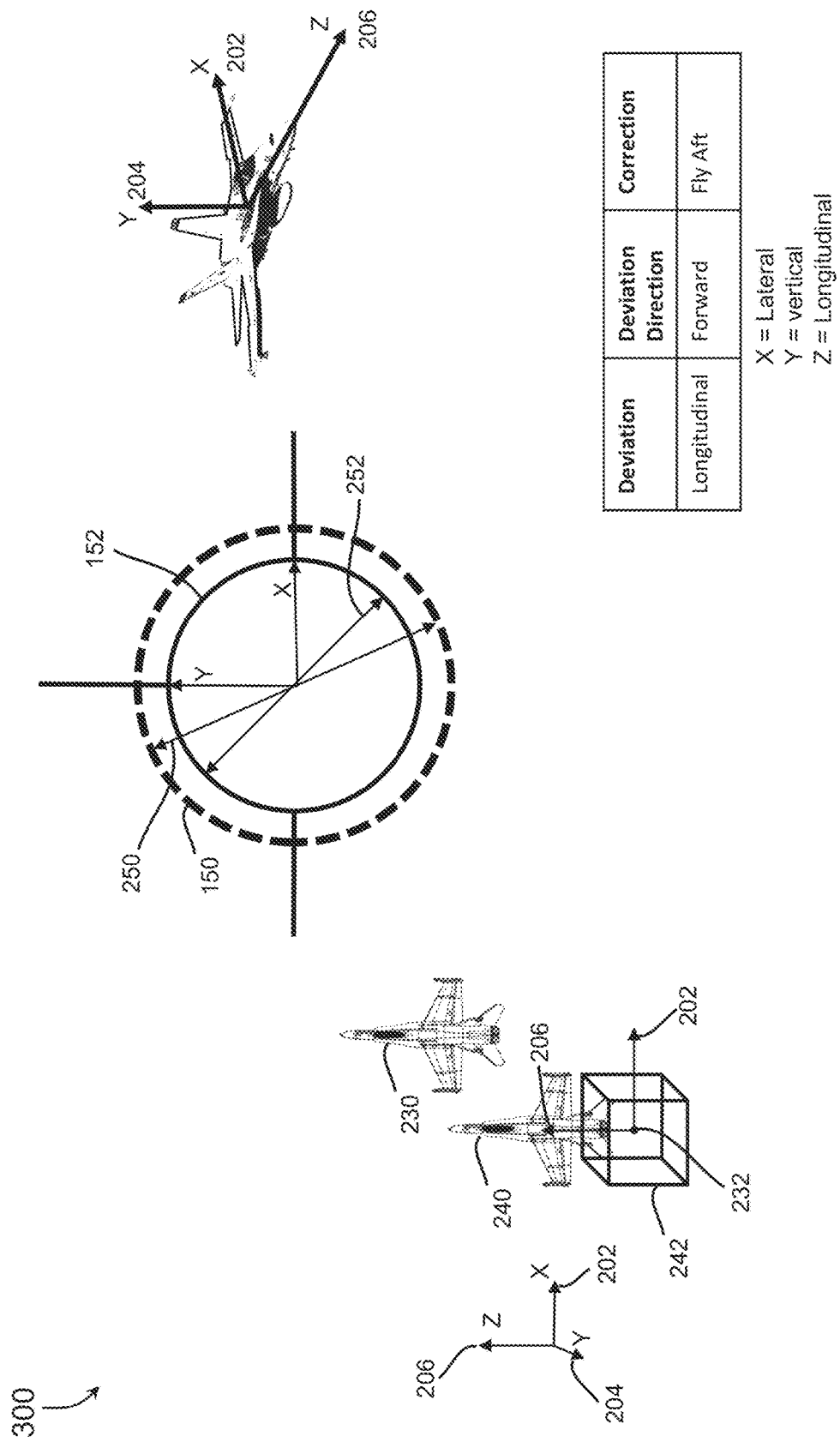

Referring now to FIG. 3B, a single axis (here Z 206) deviation may be indicated by the DLBDS diameter 250 displayed by the flight controller 110 as larger than the FPM diameter 252. Here, with a forward deviation, the pilot of the wingman aircraft 240 must reduce power and fly aft to return to the desired position 232.

Figure 3C:
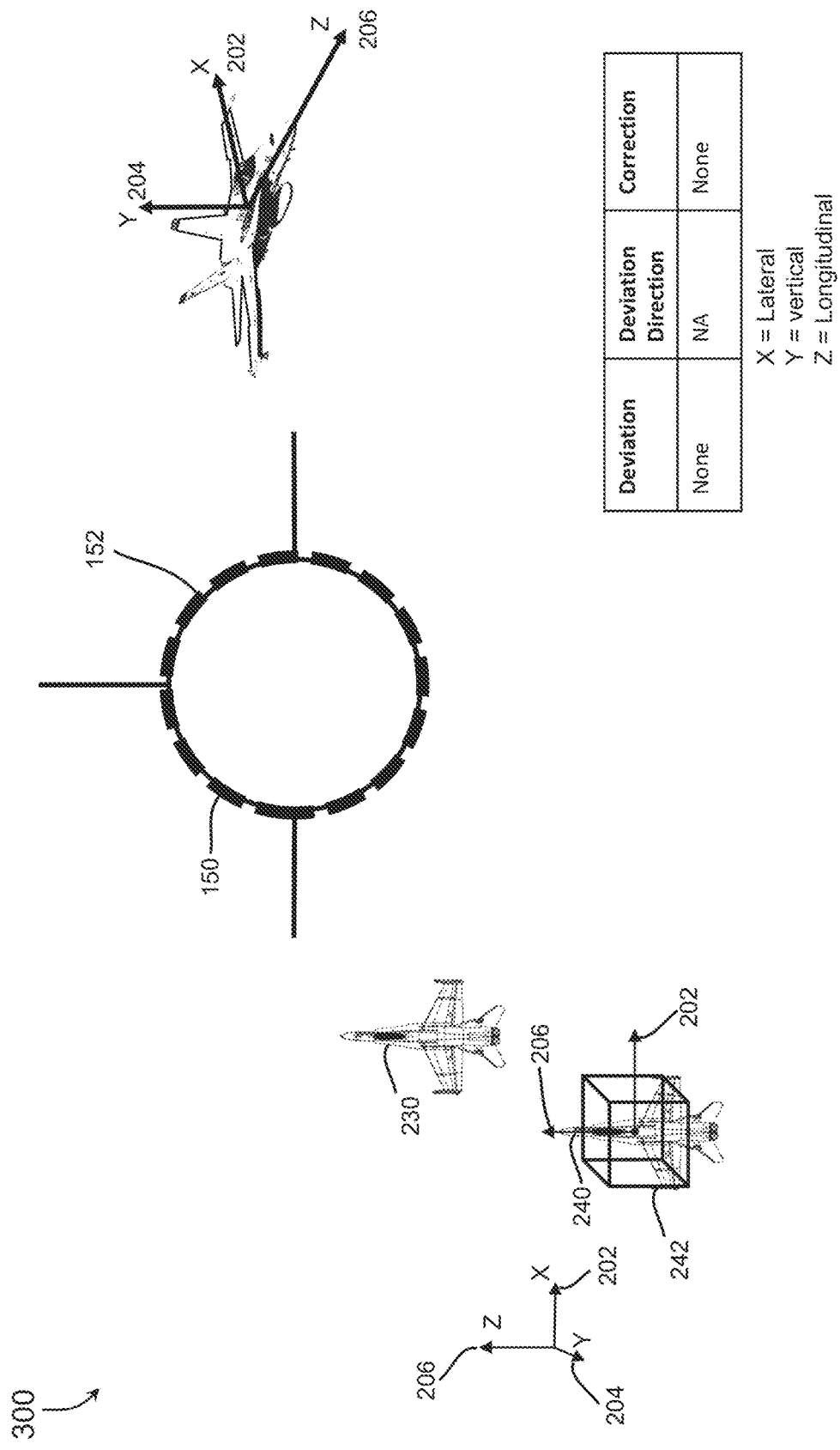

Referring now to FIG. 3C, the flight controller 110 may indicate a zero deviation with a concentric DLBDS 150 collocated with the FPM 152. In one embodiment of the inventive concepts disclosed herein, the DLBDS diameter 250 may be displayed relative to the FMP diameter 252. Should a wingman aircraft 240 be longitudinally in the desired position (zero longitudinal deviation) the controller 110 may display the DLBDS diameter 250 equal to the FMP diameter 252.

Figure 3D:
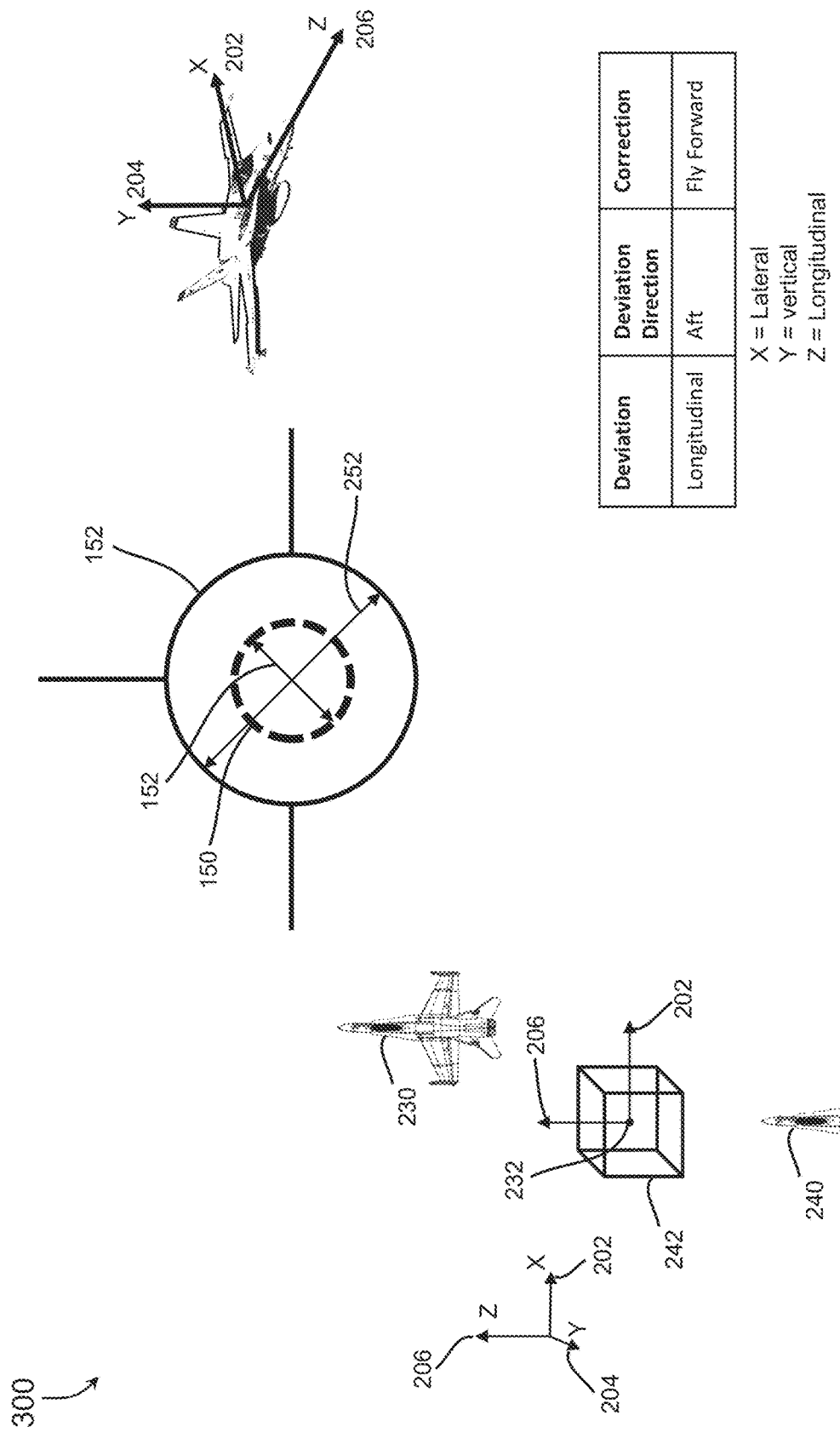

Referring now to FIG. 3D, the flight controller 110 may indicate a single axis (here Z 206) deviation between the aircraft and the desired position 232 with a DLBDS diameter 250 smaller than that of the FPM diameter 252. In one embodiment of the inventive concepts disclosed herein, the system for display of looming ball aircraft guidance 100 may function to direct a speed of the aircraft 250 using the DLBDS 150 diameter as a speed reference. Here, the diameter of the DLBDS 150 may change relative to the longitudinal deviation 306 from a desired speed.

For example, should the pilot desire or be assigned a specific speed, should the aircraft be faster than the desired speed (correction: slow down), the DLBDS diameter 250 may be displayed as greater than that of the FMP diameter 252 and smaller (correction: speed up) if slower. As before, the lateral 302 and vertical 304 deviations may be displayed with a left right up down display of the DLBDS 150 relative to the FMP 152.

Figure 3E:
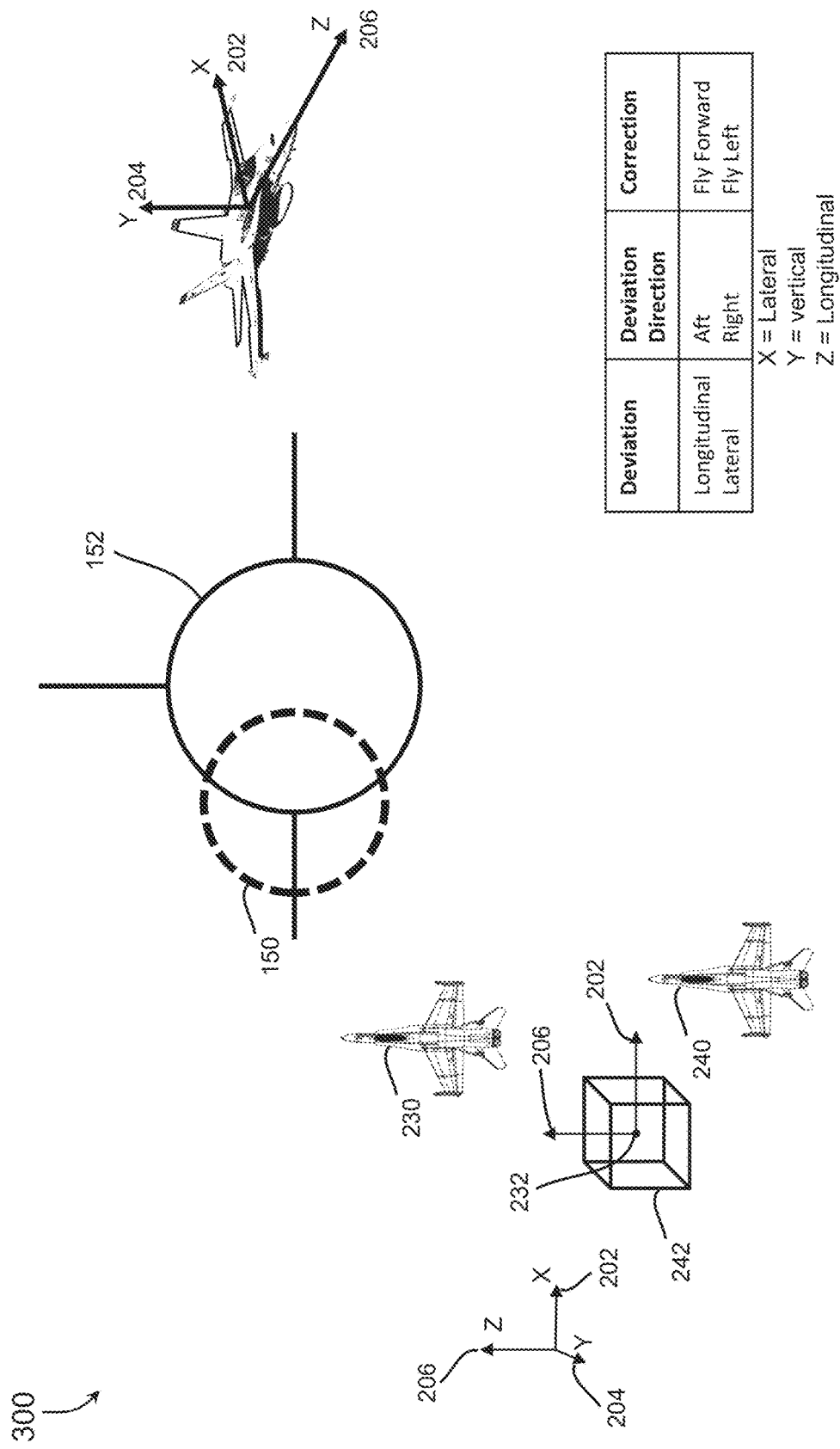

Referring to FIG. 3E, a multi axis deviation of aft and right may be indicated with a DLBDS 150 position left of the FPM 152 with a DLBDS diameter 250 smaller than the FPM diameter 252.

Figure 3F:
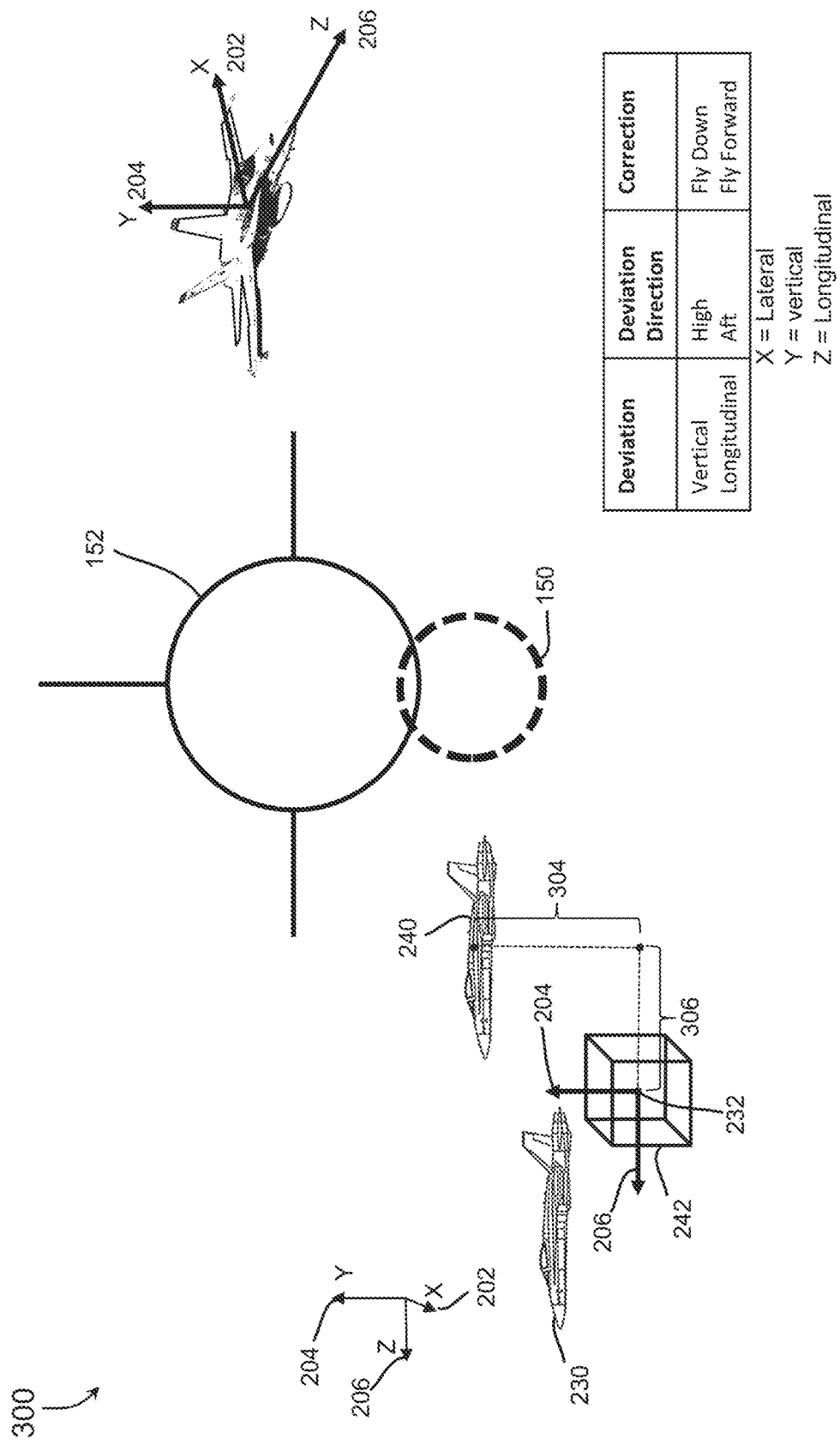

From a different perspective, FIGS. 3F-3J may show a side view with the longitudinal axis Z 206 indicated horizontally. FIG. 3F may indicate a high and aft deviation requiring the pilot of the wingman aircraft 240 to fly down and fly forward to regain the desired position 232.

Figure 3G:
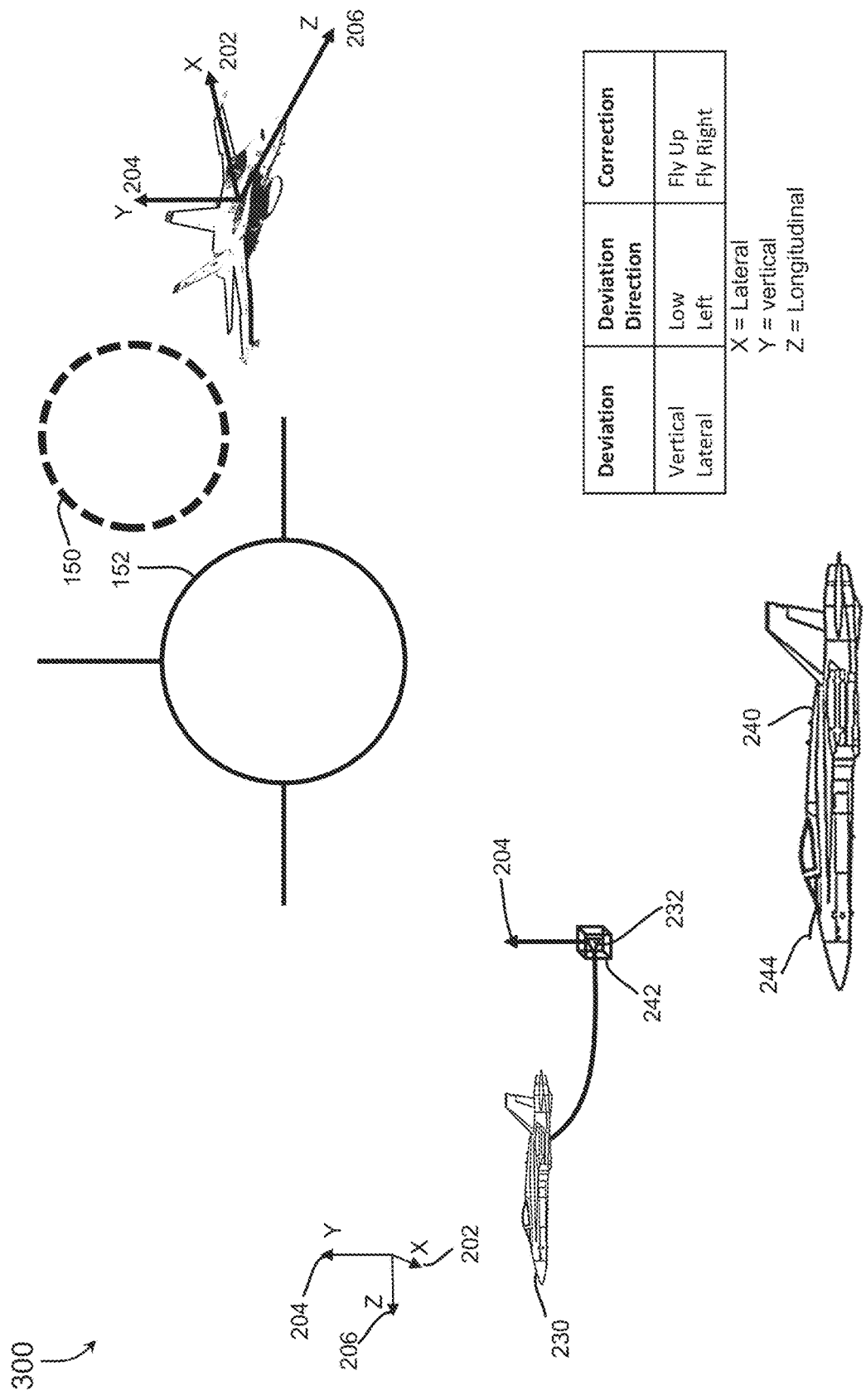

Referring to FIG. 3G, the lead aircraft has now deployed an aerial refueling basket as the object. Here, the desired position relative to the object may be collocated with the object and the boundary size may be relatively small. Here, the flight controller 110 may use a position of an aerial refueling probe 244 on the wingman aircraft for determining the 3D deviation between the aerial refueling probe 244 and the desired position 232. To place the aerial refueling probe within the aerial refueling basket, the pilot of the wingman aircraft 240 may fly up and fly right to engage the basket.

Figure 3H:
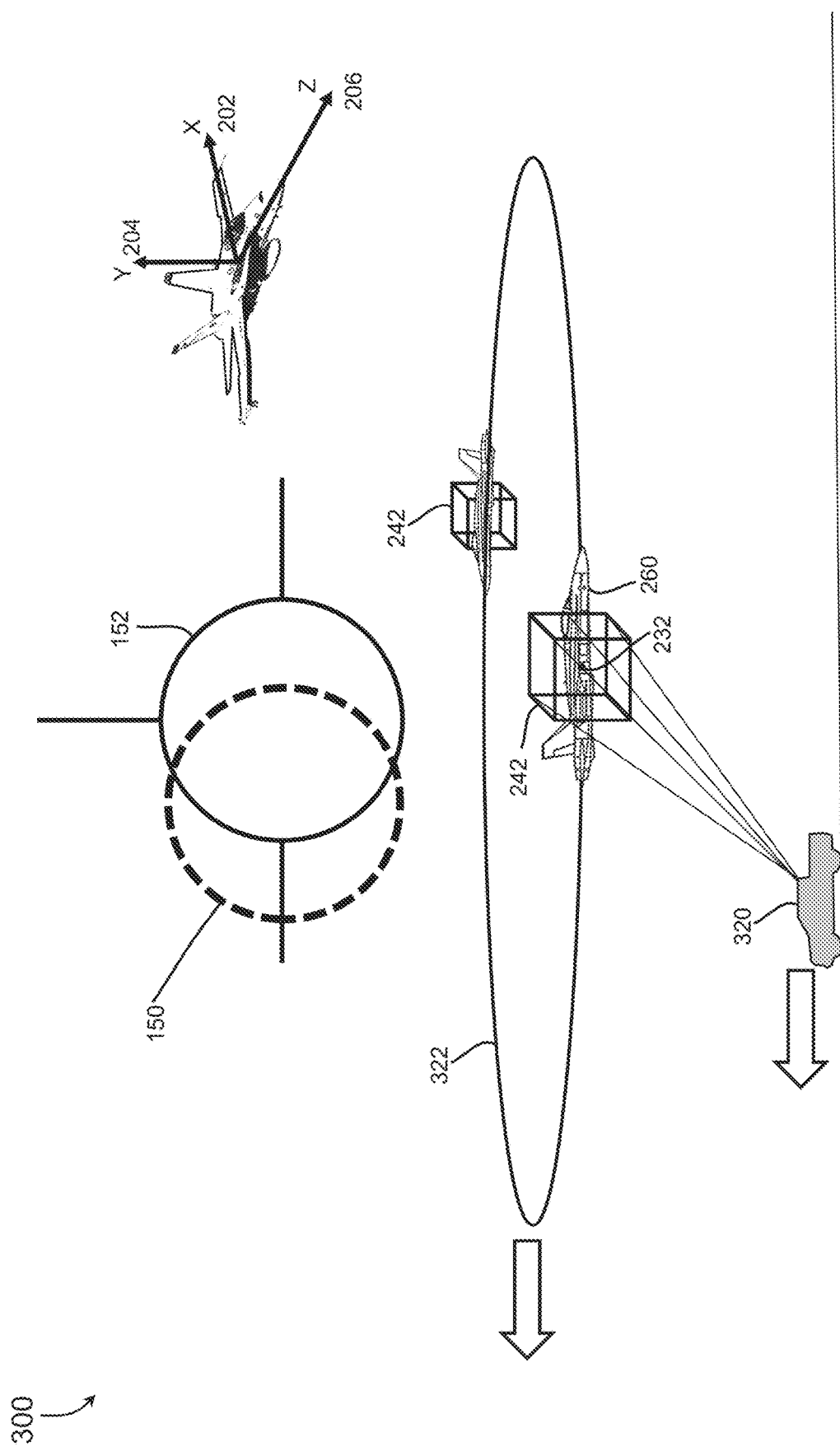

Referring to FIG. 3H, a two-ship formation of a strike aircraft 260 may desire to maintain an orbit 322 as the desired position relative to a surface target object 320 (here, a moving truck). As the ground target object 320 moves, the desired orbit 322 relative to the surface target object 320 may move at a similar trajectory. Here, the flight controller 110 may display the DLBDS 150 to induce a continuous left turn to maintain the desired orbit 322.

Here, the flight controller 110 may determine a best course of flight for the aircraft to regain the desired position 232. In one situation, the flight controller 110 may employ a lead pursuit path with the DLBDS 150 directing the pilot to lead (flight path to a point where the desired position will be) the desired position 232 to shorten the distance and time required for the to achieve the desired position 232. Conversely, the flight controller 110 may employ a pure pursuit (flight path on the desired position 232) or lag pursuit (flight path behind the desired position 232) to achieve desired results.

Figure 3I:
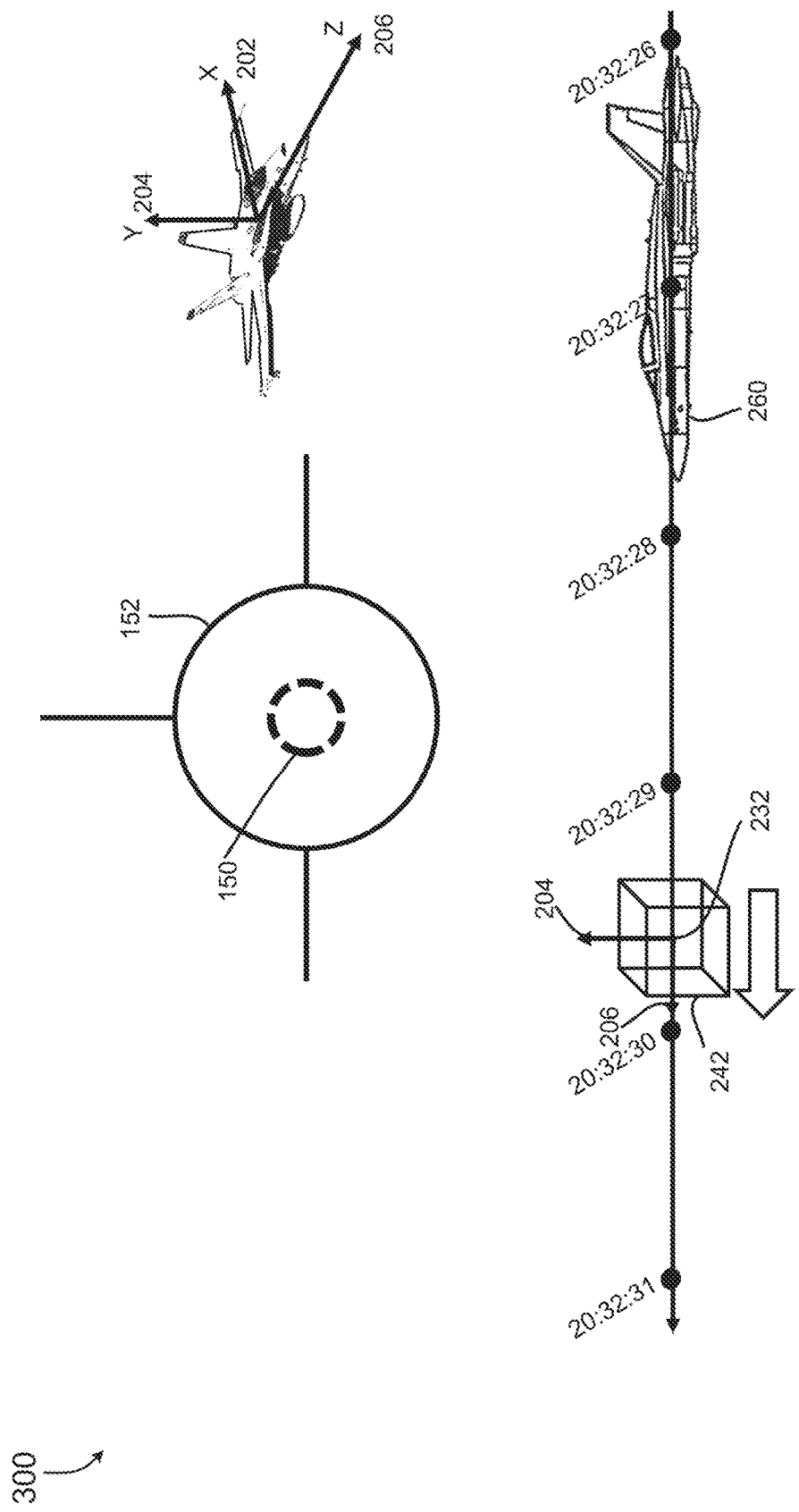

Referring to FIG. 3I, the flight controller 110 may employ a timeline reference related object to enable the strike aircraft 260 to fly a desired path over time to reach a desired surface target at a specific time. In this example, the strike aircraft 260 should be within the position boundary 242 and is currently behind the desired timeline reference. The flight controller 110 may display the DLBDS 150 with a DLBDS diameter 250 smaller than the FPM diameter 252 to indicate to the pilot to fly faster to regain the desired time related object.

Figure 3J:
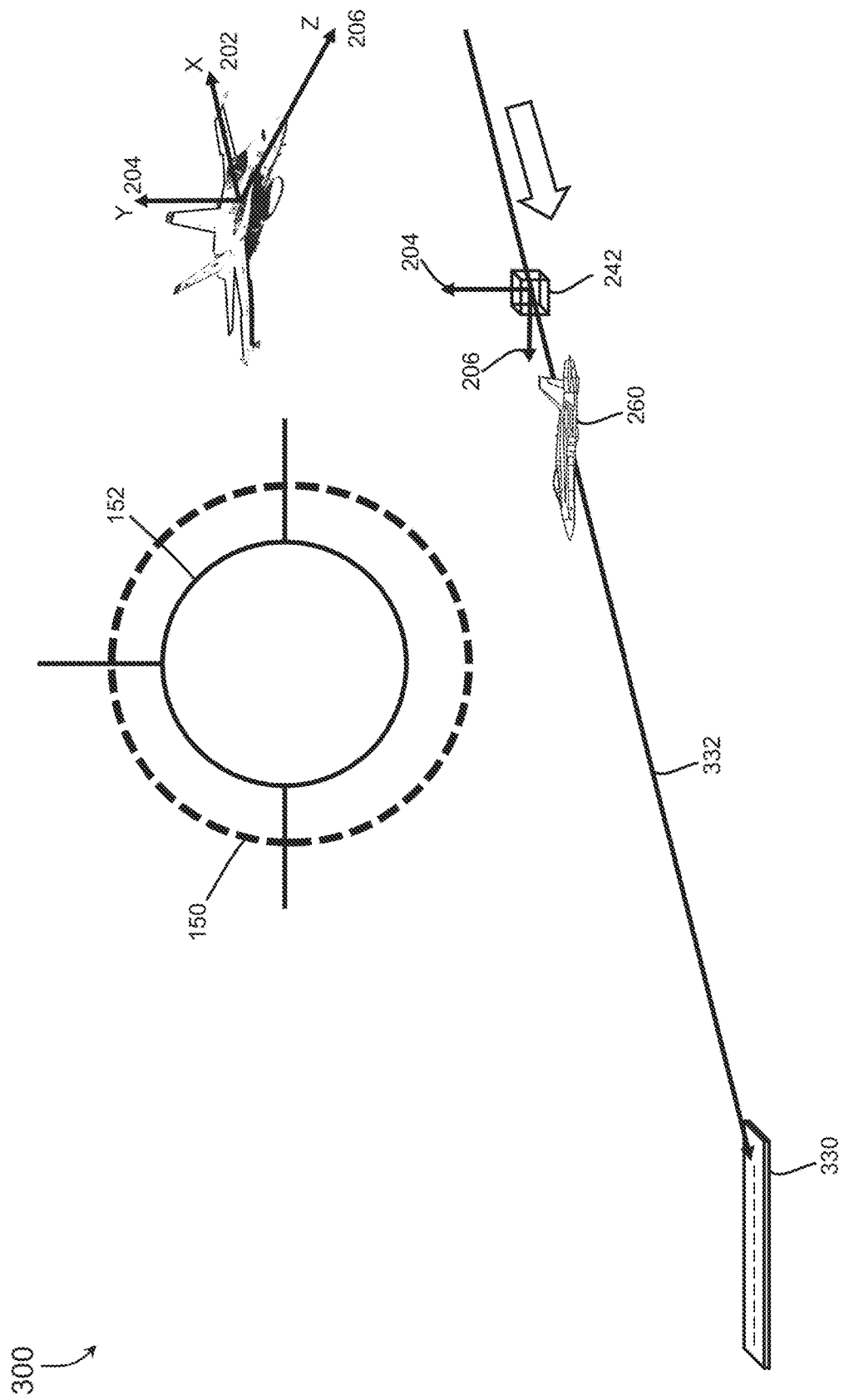

Referring to FIG. 3J, the object here may be a landing surface 330 where the position relative to the desired object may may be continuously updated to create a desired path relative to the object (e.g., a 3D path over time). Here, the strike aircraft 260 may be commanded to fly a specific time along a glideslope 332 to land at a specific time. The flight controller 110 may display the DLBDS 150 with appropriate corrections to maintain the glideslope 332 as well as maintain the desired path relative to the object via the desired position 232.

For example, on approach to an airport landing surface 330, a controlling agency (e.g. air traffic control) may command a specific landing time. The flight controller 110 may receive the pilot command and display the DLBDS 150 to enable to strike aircraft 260 to maintain the 3D deviation from the strike aircraft 260 to the position boundary 242 at zero.

FIG. 4

Figure 4:
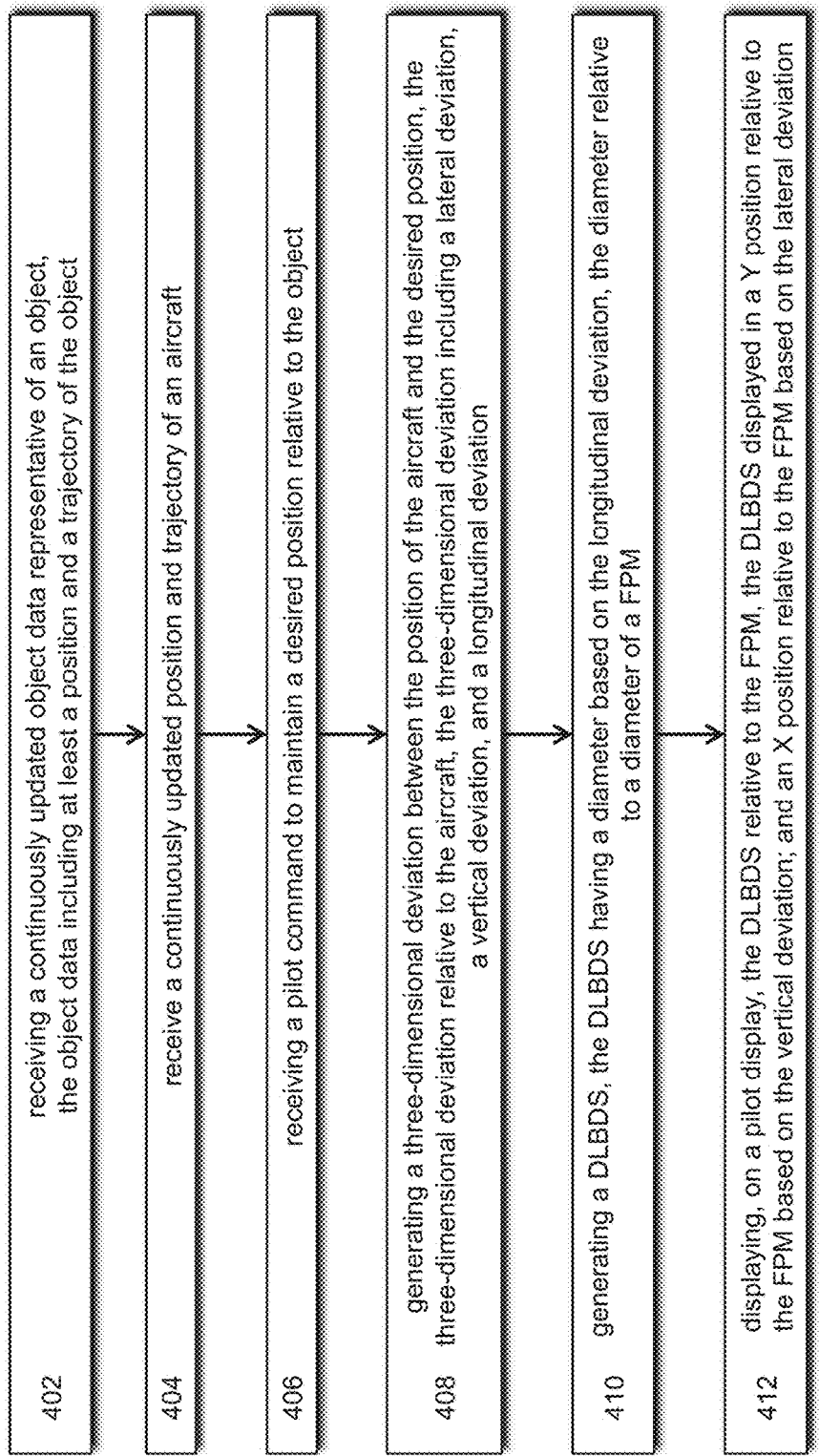
FIG. 4 is a diagram of a method flow exemplary of one embodiment of the inventive concepts disclosed herein.

Referring now to FIG. 4, a diagram of a method flow exemplary of one embodiment of the inventive concepts disclosed herein is shown. The method flow 400 for display of looming ball aircraft guidance may include, at a step 402, receiving a continuously updated object data representative of an object, the object data including a position and a trajectory of the object, and at a step 404, receiving a continuously updated position and trajectory of an aircraft.

The method may include, at a step 406, receiving a pilot command to maintain a desired position relative to the object and at a step 408, generating a three-dimensional deviation between the position of the aircraft and the desired position, the three-dimensional deviation relative to the aircraft, the three-dimensional deviation including a lateral deviation, a vertical deviation, and a longitudinal deviation.

The method may include, at a step 410, generating a dynamic looming ball deviation symbology (DLBDS), the DLBDS having a diameter based on the longitudinal deviation, the diameter relative to a diameter of a flight path marker (FPM), and, at a step 412, displaying, on a pilot display, the DLBDS relative to the FPM, the DLBDS displayed in a Y position relative to the FPM based on the vertical deviation and an X position relative to the FPM based on the lateral deviation.

CONCLUSION

As will be appreciated from the above description, embodiments of the inventive concepts disclosed herein may provide a novel solution to pilot guidance offering an intuitive single source of pilot guidance displayed on a pilot display.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for display of looming ball aircraft guidance, comprising:
  a pilot display available to a pilot of an aircraft, the pilot display including a flight path marker (FPM);
  a dynamic looming ball deviation symbology (DLBDS) displayable on the pilot display, the DLBDS generated by a flight controller onboard the aircraft, the flight controller configured to receive inputs from each of a data link and an aircraft system bus;
  the data link configured for a data communication external to the aircraft;
  the aircraft system bus configured for a communication of an aircraft state;
  the flight controller operatively coupled with each of the pilot display, the data link, and the aircraft system bus, the flight controller configured at least for determining a position and a trajectory of the aircraft;
  a tangible, non-transitory memory configured to communicate with the flight controller, the tangible, non-transitory memory having instructions stored therein that, in response to execution by the flight controller, cause the flight controller to:
  receive, from the data link, an object data representative of an object, the object data including at least a position and a trajectory of the object;
  receive from the aircraft system bus, the position and the trajectory of the aircraft;
  receive a command from the pilot to maintain a desired position relative to the object;
  generate a three-dimensional deviation between the position of the aircraft and the desired position relative to the object based on the object data and the position of the aircraft, the three-dimensional deviation relative to the aircraft;
  the three-dimensional deviation including a lateral deviation, a vertical deviation, and a longitudinal deviation;
  generate the DLBDS, the DLBDS having a diameter based on the longitudinal deviation, the diameter relative to a diameter of the FPM; and
  display, on the pilot display, the DLBDS relative to the FPM, the DLBDS displayed in:
    a Y position relative to the FPM based on the vertical deviation; and
    an X position relative to the FPM based on the lateral deviation.

2. The system for display of looming ball aircraft guidance of claim 1, wherein the DLBDS comprises a segmented circle displayed relative to the FPM and a zero deviation in each of the lateral deviation, the vertical deviation, and the longitudinal deviation is represented by the DLBDS concentrically displayed with the FPM.

3. The system for display of looming ball aircraft guidance of claim 1, wherein, as viewed by the pilot, the Y position relative to the FPM further comprises a position above the FPM corresponding a low vertical deviation, a position below the FPM corresponding a high deviation, and the X position relative to the FPM further comprises a position right of the FPM corresponding to a left deviation, and a position left of the FPM corresponding to a right deviation.

4. The system for display of looming ball aircraft guidance of claim 1, wherein a zero longitudinal deviation is displayed via the DLBDS diameter equal to the FPM diameter, a longitudinal deviation aft of the desired position results in the DLBDS diameter smaller than the FPM diameter, and the longitudinal deviation forward of the desired position results in the DLBDS diameter larger than the FPM diameter.

5. The system for display of looming ball aircraft guidance of claim 1, wherein the non-transitory memory is further configured to cause the flight controller to:
  continuously update each of the object data and the position and trajectory of the aircraft;
  continuously update the three-dimensional deviation and continuously update the DLBDS diameter, the Y position, and the X position based on the updated three-dimensional deviation; and
  display the DLBDS at the continuously updated Y position, X position, and diameter.

6. The system for display of looming ball aircraft guidance of claim 1, wherein the non-transitory memory is further configured to cause the flight controller to: generate a desired position boundary around the desired position relative to the object, the desired position boundary having a boundary size; and display the DLBDS based on the three-dimensional deviation between the position of the aircraft and the desired position boundary.

7. The system for display of looming ball aircraft guidance of claim 6, wherein the boundary size is based on one of a 1) range between the desired relative position and the object, 2) a size of each of the object and the aircraft, and 3) a mission of the aircraft.

8. The system for display of looming ball aircraft guidance of claim 1, wherein the object includes one of an aircraft, an aerial refueling boom, an aerial refueling basket, a landing surface, a surface target, a ship, a time based position, a speed based position, and a three-dimensional path.

9. The system for display of looming ball aircraft guidance of claim 1, wherein the flight controller is one of a mission computer, a flight control computer, and a flight management system and wherein the pilot of the aircraft is one of an onboard human pilot, an offboard human pilot, and an autopilot.

10. The system for display of looming ball aircraft guidance of claim 1, wherein the desired position relative to the object is based on one of a mission of the aircraft, the aircraft state, an object type, the object position, and the object trajectory.

11. The system for display of looming ball aircraft guidance of claim 1, wherein the display of the DLBDS relative to the FPM further comprises a dynamic motion of the DLBDS based on one of a change in the three-dimensional deviation and a rate of change in the three-dimensional deviation.

12. The system for display of looming ball aircraft guidance of claim 1, wherein the longitudinal deviation is relative to one of a time reference and a timeline relative to the object.

13. A method for display of looming ball aircraft guidance, comprising:
receiving a continuously updated object data representative of an object, the object data including at least a position and a trajectory of the object;
receiving a continuously updated position and trajectory of an aircraft;
receiving a pilot command to maintain a desired position relative to the object;
generating a three-dimensional deviation between the position of the aircraft and the desired position, the three-dimensional deviation relative to the aircraft, the three-dimensional deviation including a lateral deviation, a vertical deviation, and a longitudinal deviation;
generating a dynamic looming ball deviation symbology (DLBDS), the DLBDS having a diameter based on the longitudinal deviation, the diameter relative to a diameter of a flight path marker (FPM); and
displaying, on a pilot display, the DLBDS relative to the FPM, the DLBDS displayed in:
a Y position relative to the FPM based on the vertical deviation; and
an X position relative to the FPM based on the lateral deviation.

14. The method for display of looming ball aircraft guidance of claim 13, wherein the desired position relative to the object is continuously updated to create a desired path relative to the object.

15. The method for display of looming ball aircraft guidance of claim 13, wherein receiving the pilot command further includes receiving an onboard pilot input, an offboard pilot input, and an automated input.

* * * * *